United States Patent

[11] 3,597,010

[72] Inventors George A. Berman
　　　　　　　Detroit;
　　　　　　　Graydon J. Choinski, Utica, both of, Mich.
[21] Appl. No. 878,665
[22] Filed Nov. 21, 1969
[45] Patented Aug. 3, 1971
[73] Assignee TRW Inc.
　　　　　　　Cleveland, Ohio

[54] PRESSURE CONTROL VALVE
　　　2 Claims, 17 Drawing Figs.
[52] U.S. Cl. .................................................. 303/10,
　　　　　　　　　　　　　　　　　　137/115, 188/181, 303/21
[51] Int. Cl. ................................................. B60t 8/06,
　　　　　　　　　　　　　　　　　　　　　　　　B60t 13/16
[50] Field of Search .............................................. 188/181;
　　　　　　　　　　　　　　　　　　303/21, 24, 61—63, 68—69, 10

[56] References Cited
UNITED STATES PATENTS
| | | | |
|---|---|---|---|
| 3,423,136 | 1/1969 | Lohbauer..................... | 303/10 X |
| 3,515,441 | 6/1970 | Stein .............................. | 303/10 X |
| 3,519,311 | 7/1970 | Holden.......................... | 303/10 |

Primary Examiner—Milton Buchler
Assistant Examiner—John J. McLaughlin
Attorney—Hill, Sherman, Meroni, Gross & Simpson ABSTRACT: A pressure-compensating valve for use with a hydraulic skid control brake system wherein a cylindrical bar stock piece is machined to provide a center flow pintle cooperable with an annular scanning annulus, thereby to provide a stepped and partially infinitely variable valve which permits partial or full diameter area sections to freely be sensed in a balanced state relieving any tendency for the pressure-compensating valve to bind or otherwise develop hydraulic imbalance.

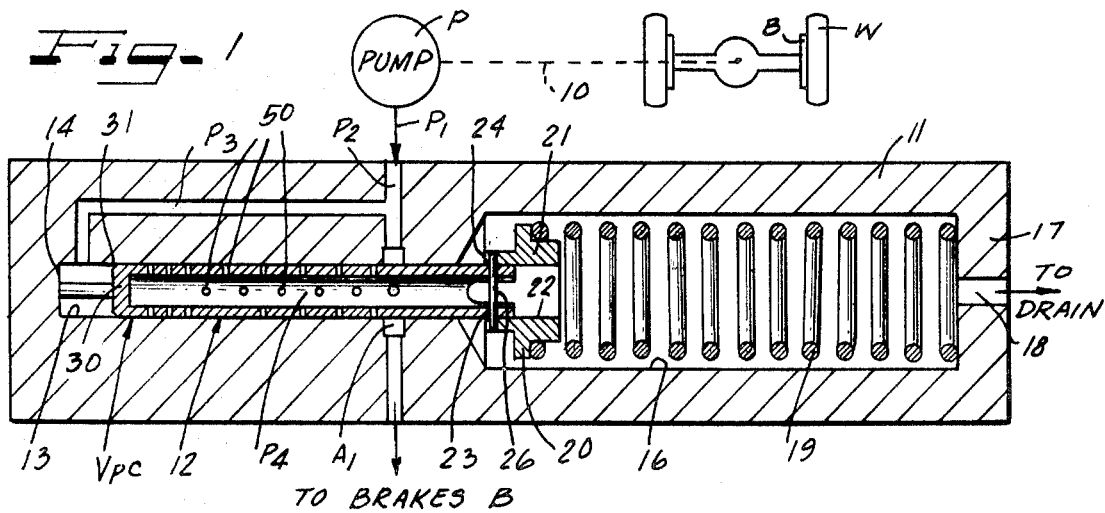
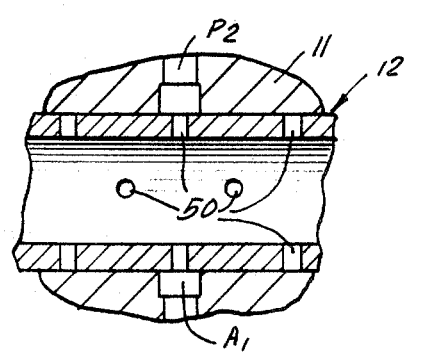
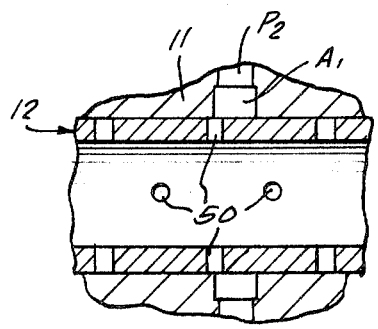
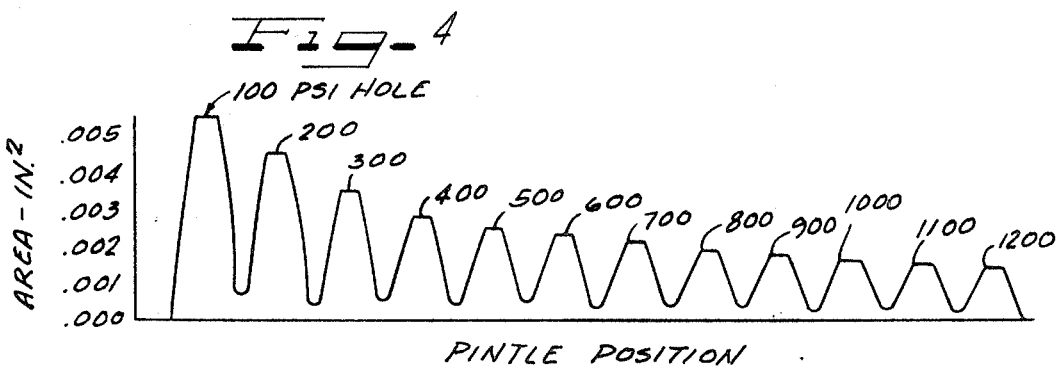

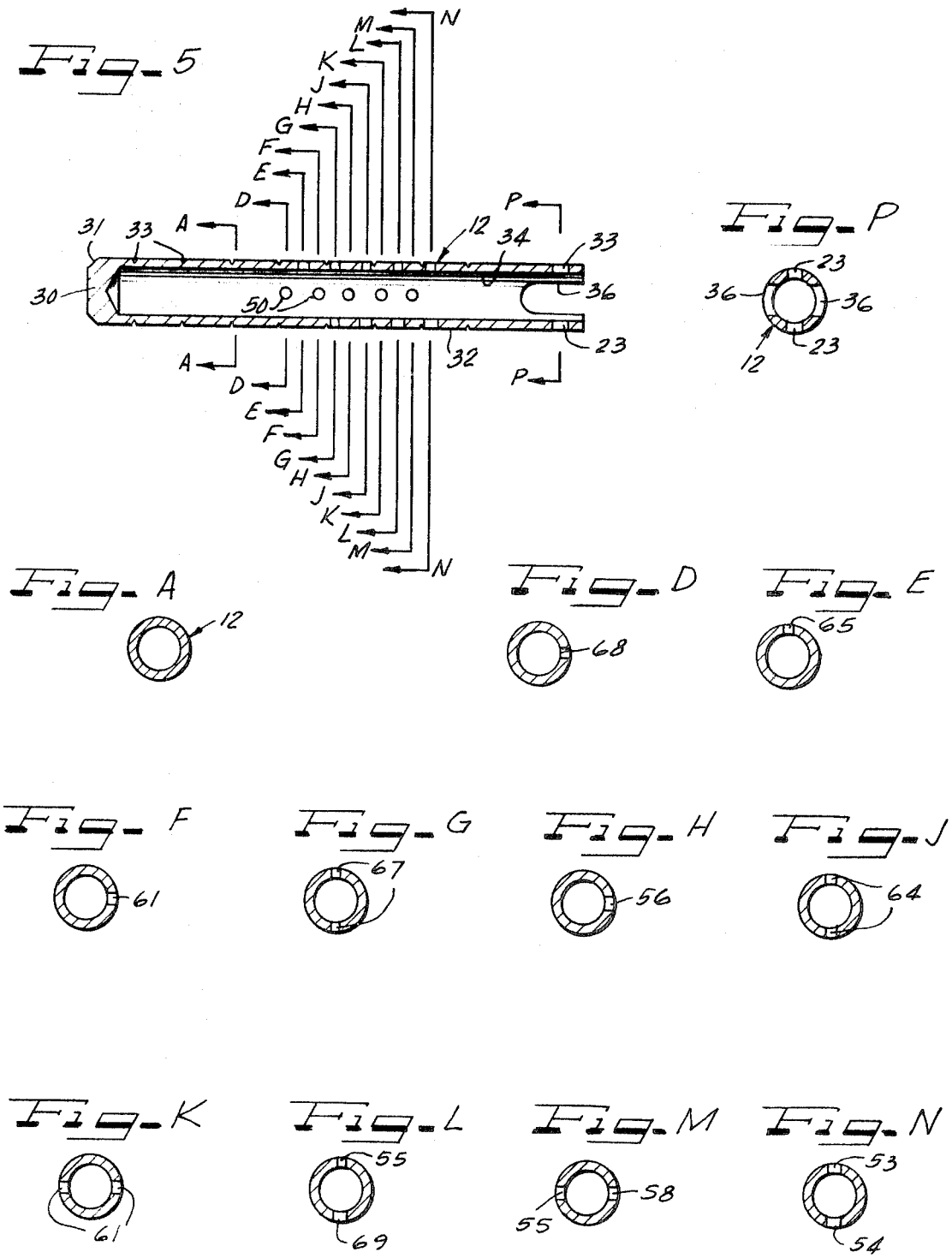

PRESSURE CONTROL VALVE

BACKGROUND OF THE INVENTION

1. Field of the Invention

This invention relates generally to hydraulic skid control brake systems and more particularly relates to an improved pressure-compensating valve configuration for use in such a system.

2. Description of the Prior Art

In a prior pending application of Gilbert H. Drutchas, Ser. No. 829,551 filed June 2, 1969 there is disclosed an hydraulic skid control brake system wherein prior to a brake application there exists two basic flow modes, one through a throttle valve and the other through a pressure-compensating valve. The pressure-compensating valve of the present invention constitutes an improvement over the pressure-compensating valve shown in that disclosure.

SUMMARY OF THE INVENTION

The pressure-compensating valve of the present invention utilizes a center flow pintle concept. A housing having a cylindrical valve bore closed at one end and a counterbored spring recess axially adjacent thereto vented to drain, an enlarged core around the cylindrical valve bore is referred to as the scanning annulus. A pintle valve in the valve bore has a closed end wall adjacent the closed end of the bore and a hollow interior as well as an open end projecting into the spring recess. Continuous biasing means connected to the open end of the pintle valve load the same in one direction. First and second passage means formed in the housing leading to and from the annulus from a source of pressure generated by a wheel-driven pump and to a vehicle braking means, respectively, and from the first passage means to the closed end of the valve bore allow a plurality of orifices in the walls of the pintle valve to be successively scanned in the scanning annulus, thereby permitting partial or full diameter area sections to be freely sensed in a balanced state.

The orifices in the walls of the pintle valve are arranged and disposed in a longitudinal row and have successively decreasing areas from one end of the row to the other. Any tendency for the pressure-compensating valve to bind or otherwise develop hydraulic imbalance is thus relieved.

BRIEF DESCRIPTION OF THE DRAWINGS

FIG. 1 is a cross-sectional view of a pressure-compensating valve provided in accordance with the principles of the present invention and is shown in combination with a schematic plumbing diagram to illustrate the location of the pressure-compensating valve in an hydraulic skid control braking system.

FIGS. 2 and 3 are enlarged fragmentary cross-sectional views illustrating how the scanning annulus permits partial or full diameter area sections to freely be sensed in a balanced state of the center flow pintle pressure-compensating valve.

FIG. 4 is a graph plotting area against the pressure so that the figure represents the changing diameter's area interface with the scanning annulus.

FIG. 5 is an enlarged cross-sectional view of the center flow valve pintle.

FIG. A is a cross-sectional view taken on line A-A of FIG. 5.

FIGS. D, E, F, G, H, J, K, L, M, and N are all corresponding cross-sectional views taken on lines D-D and correspondingly designated sectional lines on FIG. 5.

FIG. P is a cross-sectional view taken on line P-P of FIG. 5.

DESCRIPTION OF THE PREFERRED EMBODIMENT

Although the principles of the pressure-compensating valve disclosed herein are of general applicability, a particularly useful application is made in a hydraulic skid control brake system herein shown schematically to establish an environment of particular utility. Thus, there is shown the wheels of a vehicle indicated at W and having a brake mechanism indicated at B. A pump is shown at P and has a driven connection with the wheels shown at 10. The pump discharges through a line $P_1$ into a housing 11 in which is formed a passage $P_2$ communicating with a scanning annulus $A_1$ which circumscribes a center flow pintle valve shown generally at 12 and movable slidably and axially within a bore 13 constituting a cylindrical valve bore formed in the housing 11 and closed at one end by an end wall 14.

The housing 11 has an enlarged counterbored spring recess 16. The spring recess 16 is axially adjacent the bore 13 and has an end wall 17 in which is formed an opening 18 leading to drain. A coil spring 19 is bottomed against the end wall 17 at one end and has its other end bottomed against one surface of a flange 20 forming an abutment surface for a retainer member 21 which is piloted into the ends of the coiled convolutions of the coil spring 19.

The retainer member 21 has a bore 22 into which is slidably pressed the center flow pintle valve 12. The end of the pintle valve 12 is apertured as at 23 and the retainer member 21 is correspondingly apertured as at 24, thereby to receive a roll pin 26 provided to lock the pintle valve 12 and the retainer 21 together.

Referring to FIG. 5, it will be noted that the pintle valve 12 comprises a generally cylindrical part which can be conveniently machined from a cylindrical bar stock piece. Thus, the pintle valve 12 has an elongate cylindrical configuration including a closed end wall 30 having a chamfered corner 31. An outer peripheral surface 32 formed on the valve 12 has a row of grooves which are generally equally spaced and which are shown as at 33. The pintle valve 12 is made hollow by virtue of an internal bore 34. The open end of the valve 12 has an inwardly projecting recess 36 to facilitate assembly with the retainer 21.

The pintle valve 12 is particularly characterized by a plurality of orifices which are adapted to enter the scanning annulus $A_1$, and for convenience in identification are shown generally at 50 on FIG. 5 but which are identified more specifically on the lettered sectional views FIGS. D, E, F, G, H, J, K, L, M and N. Generally, it may be noted that the orifices arranged to enter the scanning annulus $A_1$ are of decreasing diameter. In a typical application of the principles of the present invention, the valve pintle 12 is approximately 2 inches long and the various openings 50 are made of different drill sizes as shown in the lettered sectional views. Thus, for example, in FIG. D, the opening is made by a No. 68 drill (0.031 inches in diameter). In FIG. E the opening is made by a No. 65 drill (0.035 inches in diameter), while in FIG. F the opening is shown as made by a No. 61 drill (0.039 inches in diameter). To select the size of the area exposed to the scanning annulus, it will be noted that in FIG. K openings on diametrically opposite sides of the pintle valve are both made by a No. 61 drill (0.039 inches), while in FIG. L, the opening on one side is made by a No. 55 drill (0.052 inches) and on the opposite side by a No. 69 drill (0.0292 inches). Likewise, in FIG. M, an opening on one side is made by a No. 55 drill (0.052 inches), while on the opposite side the opening is made by a No. 58 drill (0.042 inches). In FIG. N, the opening is shown made by a No. 53 drill (0.0595 inches), while the opening indicated at 54 is made with a No. 54 drill (0.055 inches).

Flow issuing from the pump P enters the passage $P_2$ and thence flows to the scanning annulus $A_1$ where it circumscribes the pintle 12.

A passage $P_3$ is formed in the housing 11 and leads to the bore 13 behind the end wall 31 of the pintle valve 12. The flow passes through the first orifice 50 (viz., 53, 54 of FIG. N), thereby creating a pressure drop and then passes through the interior of the pintle valve 12 via the bore 34 and thence through the spring recess 16 and to drain via the opening 18 in the end wall 17.

Prior to a brake application, there exists two basic flow modes, one through the throttle valve of the braking system and the other through the pressure-compensating valve. Application of a braking effort to the master cylinder forces the throttle valve to close, thereby shunting all of the hydraulic flow through the pressure-compensating valve. Such diversion causes a sudden pressure surge because the pump flow increases in the passage $P_1$ and $P_2$ as well as in the scanning annulus $A_1$ and in the spring recess 16 and through the orifice 50 first presented to the scanning annulus, namely, the orifice shown in FIG. N (53 and 54). The rising pressure registering on the end wall 31 of the pintle valve 12 forces the pintle valve 12 to the right as the area on the right-hand side of the pintle valve is under the influence of atmospheric pressure alone.

Movement of the pintle valve 12 continues to close the successive orifices and such orifices are of decreasing area. The increasing pressure drop creates a force acting on the end wall 31 which is greater than the spring force reaction of the coil spring 19. Thus, the slowing down of the vehicle wheel W causes the flow to drop from the wheel-driven pump P which can be flowing through any one of the orifices individually as shown in FIG. N and down successively through FIG. D, (depending on which opening 50 is in the scanning annulus $A_1$). Consequently, such action results in a drop of pressure in the passage $P_2$ and less force on the wall 31 of the pintle valve 12 and a subsequent reversal in the direction of the pintle valve 12 by the action of the coil spring 19.

Thus, the system tries to adjust to a larger sized hole and a lesser system pressure. A sudden lowering of pump speed, (the signal of a low coefficient), will drop the pressure down and the valve pintle 12 will position any one of the larger diameter holes, i.e. the lower pressure holes, into the scanning annulus $A_1$. It is also possible to have the system select a partial hole setting in the scanning annulus. In FIG. 2, a set of holes 50 are shown in full diameter section. In FIG. 3 a set of holes 50 are shown related to the annulus $A_1$ and a partial hole setting.

The passage $P_3$ is used to give a dashpotting effect to reduce the underdamped effect of the pressure-compensating valve during hydraulic transients.

The graph of FIG. 4 shows a typical plot of area versus pressure. Thus, the graph of FIG. 4 represents the effect of the changing diameter's area interface with the scanning annulus.

We claim as our invention:

1. A pressure-compensating valve for a hydraulic skid control system comprising:

a housing having a cylindrical valve bore closed at one end and a counterbored spring recess axially adjacent thereto at the other end and being vented to drain, a scanning annulus formed in said housing around said bore between said two ends, and a pintle valve in said valve bore, said pintle valve having a closed end wall adjacent the closed end of said cylindrical valve bore, a hollow interior and having an open end projecting into said spring recess, continuous biasing means connected to said open end of said pintle valve and loading said pintle valve in one direction, first and second passage means formed in said housing leading to and from said annulus from a source of pressure generated by a wheel-driven pump and to a vehicle braking means respectively, and from said first passage means to the closed end of said valve bore, and a plurality of orifices in the walls of said pintle valve arranged and disposed in longitudinal rows and having successively decreasing areas from one end of the row to the other, whereby the full diameter areas will be freely sensed in a balanced state and any tendency of the pressure-compensating valve to bind or to develop hydraulic imbalance will be relieved.

2. In a hydraulic skid control brake system, a wheel-driven pump for discharging fluid to a braking system, a pressure-compensating valve including a housing formed with passage means through which the discharge of the pump is directed, said housing having a bore in which a pintle valve is axially slidable, said bore having a scanning annulus circumscribing said pintle valve, said bore and said pintle valve both being closed on one end whereby the closed end of the pintle valve forms a motive surface communicating with pump inlet for pressure loading.

a continuous biasing means loading said pintle valve in a direction opposite to the pressure loading on said motive surface, and a plurality of orifices in the walls of said pintle valve which orifices are disposed in longitudinal rows and are of decreasing diameter, whereby the slowing down of the vehicle wheel causes the flow to drop from the wheel-driven pump so that the system will try to adjust to a larger sized hole and a lesser system pressure.